United States Patent
Flann et al.

(10) Patent No.: US 10,460,028 B1
(45) Date of Patent: Oct. 29, 2019

(54) SYNTACTIC GRAPH TRAVERSAL FOR RECOGNITION OF INFERRED CLAUSES WITHIN NATURAL LANGUAGE INPUTS

(71) Applicant: Babylon Partners Limited, London (GB)

(72) Inventors: Jack Flann, London (GB); Maria Lehl, London (GB); April Tuesday Shen, London (GB); Francesco Moramarco, London (GB); Olufemi Awomosu, London (GB)

(73) Assignee: Babylon Partners Limited, London (GB)

( * ) Notice: Subject to any disclaimer, the term of this patent is extended or adjusted under 35 U.S.C. 154(b) by 0 days.

(21) Appl. No.: 16/396,398

(22) Filed: Apr. 26, 2019

(51) Int. Cl.
*G06F 17/27* (2006.01)

(52) U.S. Cl.
CPC .......... *G06F 17/271* (2013.01); *G06F 17/274* (2013.01)

(58) Field of Classification Search
CPC .................................................. G06F 17/271
USPC ............................................................. 704/9
See application file for complete search history.

(56) References Cited

U.S. PATENT DOCUMENTS

| | | | | |
|---|---|---|---|---|
| 5,528,491 A | * | 6/1996 | Kuno | G06F 17/271 704/2 |
| 9,069,750 B2 | * | 6/2015 | Zuev | G06F 17/27 |
| 9,355,372 B2 | * | 5/2016 | Howald | G06F 16/36 |

OTHER PUBLICATIONS

Bies, A., et al., Bracketing Guidelines for Treebank II Style Penn Treebank Project, Jan. 1995, 318 pages.

* cited by examiner

*Primary Examiner* — Susan I McFadden
(74) *Attorney, Agent, or Firm* — McDermott Will & Emery LLP

(57) ABSTRACT

Embodiments described herein provide a more flexible, effective, and computationally efficient means for determining multiple intents within a natural language input. Some methods rely on specifically trained machine learning classifiers to determine multiple intents within a natural language input. These classifiers typically require a large amount of labelled training data in order to work effectively, and are generally only applicable to determining specific types of intents (e.g., a specifically selected set of potential inputs). In contrast, the embodiments described herein avoid the use of specifically trained classifiers by determining inferred clauses from a syntactic graph of the input. This allows the methods described herein to function more efficiently and over a wider variety of potential inputs. Furthermore, by determining inferred clauses from a syntactic graph, rather than a semantic graph, the methods described herein avoid the additional computation and potential additional errors associated with the generation of a semantic graph from a syntactic graph.

17 Claims, 6 Drawing Sheets

US 10,460,028 B1

SYNTACTIC GRAPH TRAVERSAL FOR RECOGNITION OF INFERRED CLAUSES WITHIN NATURAL LANGUAGE INPUTS

TECHNICAL FIELD

The present disclosure relates to improvements in computational efficiency and accuracy when extracting multiple intents from natural language inputs. In particular, but without limitation, the present disclosure relates to improvements in the parsing of syntactic graphs for input phrases to determine multiple inferred clauses to provide more accurate determination of meaning for use in, for instance, dialogue systems and information extraction systems.

BACKGROUND

Traditionally, user inputs into computing systems have either been limited to a predefined set of selectable options or require the user to be proficient in a computing language in order for the input to be interpreted correctly. This is due to the relative inability for computing systems to understand natural language, that is, conventional language (such as English or Japanese) that has evolved through use between humans.

To solve this problem, natural language processing methods are being developed in order to allow users to interact with computers in a more natural and effective way. Natural language processing relates to the methods by which computers process and analyse natural language data. This is useful in dialogue systems and information extraction systems. Dialogue systems (or conversational agents) are computer systems that make use of natural language processing to converse with humans in a coherent manner. Information extraction systems make use of natural language processing to extract structured information automatically from unstructured or semi-structured machine-readable text.

One method used in natural language processing is semantic parsing. This extracts the semantic meaning of various words within a sentence. One example of this is shallow semantic parsing. Put simply, shallow parsing refers to the extraction of the 'who,' 'when,' 'what,' 'where,' 'why,' and 'how' elements of an action.

A further method used in natural language processing is syntactic parsing. This extracts the syntactic information from an input sentence. Syntax differs from semantics in that syntax relates to the grammatical structure of the sentence, whilst semantics relates to the meaning of the specific words within the sentence (the words being arranged in the sentence according to the syntax).

Generally, semantic parsing methods tend to rely on syntactic parsing, as the syntax of a sentence helps to inform its semantics.

SUMMARY

Embodiments described herein provide a more flexible, effective, and computationally efficient means for determining multiple intents within a natural language input. Some methods rely on specifically trained machine learning classifiers to determine multiple intents within a natural language input. These classifiers typically require a large amount of labelled training data in order to work effectively, and are generally only applicable to determining specific types of intents (e.g., a specifically selected set of potential inputs). In contrast, the embodiments described herein avoid the use of specifically trained classifiers by determining inferred clauses from a syntactic graph of the input. This allows the methods described herein to function more efficiently and over a wider variety of potential inputs. Furthermore, by determining inferred clauses from a syntactic graph, rather than a semantic graph, the methods described herein avoid the additional computation and potential additional errors associated with the generation of a semantic graph from a syntactic graph.

According to a first aspect, there is provided a computer-implemented natural language processing method comprising: obtaining a syntactic graph for a natural language input comprising a plurality of words, the syntactic graph comprising one or more syntactic labels, each syntactic label describing a corresponding syntactic relationship between corresponding words within the natural language input; and forming one or more inferred clauses from the syntactic graph. The one or more inferred clauses are formed by: determining one or more independent clauses from the natural language input based on the one or more syntactic labels; for each independent clause, determining a set of one or more subjects and a set of one or more objects for the independent clause; and for each independent clause, forming an inferred clause for each potential combination of the set of one or more subjects with the set of one or more objects, each inferred clause comprising a corresponding combination of one of the set of one or more subjects with one of the set of one or more objects and with a main verb of the independent clause. The method further comprises determining a response to the natural language input based on at least one of the one or more inferred clauses and outputting the determined response.

In light of the above, embodiments are able to determine inferred clauses from input text based on a syntactic (dependency) graph. The methods may be performed by a computing system. The syntactic graph might be determined as part of the method (by the computing system) or may be accessed or retrieved, for instance, from storage or from an external source.

An independent clause may be considered a clause that does not depend on another clause for meaning or grammatical validity. It may also be referred to as an ordinate clause. The main verb may be determined from its syntactic label indicating that it forms the focus of the independent clause. Accordingly, each independent clause may comprise a corresponding main verb.

According to a further embodiment, determining one or more independent clauses from the natural language input comprises, for each word from the plurality of words that has a syntactic label indicating that the word is the main verb that is the focus of an independent clause, identifying a subtree for the word from the syntactic graph to relate to a corresponding independent clause.

In the present application, a subtree for a selected word includes the syntactic graph formed from the selected word and any descendent of the selected word taken from the syntactic graph for the natural language input. It therefore refers to the group of words including the selected word and any word in the natural language input that is syntactically dependent on the selected word. The selected word then forms the root of the subtree.

According to a further embodiment, determining a set of one or more subjects for the independent clause comprises identifying each word within the independent clause that has a syntactic label identifying the word as a subject word and assigning the subject word to a corresponding subject for the independent clause.

A subject word may be any word to which the independent clause is directed (e.g., that refers to a person or thing doing an action or being described). This may be a noun or a pronoun.

According to an embodiment, determining a set of one or more subjects for the independent clause further comprises, for each identified subject word, identifying any descendants of the subject word from the syntactic graph and adding any identified descendants to the subject for that subject word.

Accordingly, assigning a subject may select a subtree for the subject word from the syntactic graph, the subtree relating to one or more words, and setting the one or more words from the subtree to be a corresponding subject. In this case, the subtree takes the subject word as the root. The subject can therefore be considered a set of words relating to a subject of the independent clause.

According to a further embodiment, determining a set of one or more subjects for the independent clause comprises, for each identified subject word: identifying any modifier words associated with the subject word in the syntactic graph; and adding any identified modifier words to the subject according to the corresponding subject word.

Accordingly, additional information related to modifiers of the subject may be included in the subject. This helps to incorporate additional information from the natural language input, to avoid context being lost when the inferred clauses are extracted. A modifier word is a word that modifies, adapts, or otherwise changes the specific meaning of another word. Modifiers include adjectives and adverbs.

Modifiers may also be formed from a modifier phrase, such as an adjective clause or an adverbial phrase. Accordingly, identifying any modifier words may include identifying a modifier word based on its syntactic label indicating that it is a modifier of the subject, specifying any descendants of the modifier word as additional modifier words for the subject, and adding the modifier word and additional modifier words to the subject.

According to an embodiment, a modifier word may be identified as associated with the subject word in response to any of the following conditions being satisfied: the subject word is a direct parent of the modifier word in the syntactic graph; or the modifier word shares an ancestor with the subject word in the syntactic graph.

Two words sharing an ancestor means that both words are syntactically dependent on the same word (the shared ancestor) in the syntactic graph. A given word (a parent) being the direct parent of another word (child) means that the child is directly syntactically dependent on the parent word, i.e., that the syntactic graph directly links the parent and the child, with the child being dependent on the parent.

According to an embodiment, determining a set of one or more objects for the independent clause comprises identifying each word within the independent clause that has a syntactic label identifying the word as an object word and assigning the object word to a corresponding object for the independent clause.

An object word may be any word that refers to an entity that is acted upon by the subject (e.g., that refers to a person or thing upon which an action is performed). The object may be directly acted upon by the subject or indirectly acted upon (indirectly affected) by the action. An object word may be a noun, pronoun, or may form part of a noun phrase.

According to an embodiment, determining a set of one or more objects for the independent clause comprises, for each identified object word, identifying any descendants of the object word from the syntactic graph and adding any identified descendants to the object for that object word.

Accordingly, assigning an object may select a subtree for the object word from the syntactic graph, the subtree relating to one or more words and setting the one or more words from the subtree to be a corresponding object. In this case, the subtree takes the object word as the root. The object can therefore be considered a set of words relating to an object of the independent clause.

According to an embodiment, determining a set of one or more objects for the independent clause comprises, for each identified object word: identifying any modifier words associated with the object word in the syntactic graph; and adding any identified object words to the object according to the corresponding object word.

Accordingly, additional information related to modifiers of the object may be included in the object. This helps to incorporate additional information from the natural language input, to avoid context being lost when the inferred clauses are extracted. A modifier word is a word that modifies, adapts, or otherwise changes the specific meaning of another word. Modifiers include adjectives and adverbs.

Modifiers may also be formed from a modifier phrase, such as an adjective clause or an adverbial phrase. Accordingly, identifying any modifier words may include identifying a modifier word based on its syntactic label indicating that it is a modifier of the object, specifying any descendants of the modifier word as additional modifier words for the object, and adding the modifier word and additional modifier words to the subject.

According to an embodiment, a modifier word is identified as associated with the object word in response to any of the following conditions being satisfied: the object word is a direct parent of the modifier word in the syntactic graph; or the modifier word shares an ancestor with the object word in the syntactic graph.

According to an embodiment, determining a set of one or more objects for the independent clause comprises, for each identified object word: identifying any non-clausal verbs associated with the object word in the syntactic graph; and adding any identified non-clausal verbs to the object according to the corresponding object word.

Accordingly, non-clausal verbs might be added to the object to ensure that information is not lost when the inferred clauses are extracted. A non-clausal verb may be any word having a syntactic label indicating that it is a non-clausal verb, i.e., that it is a verb that is not the focus of an ordinate (independent) or subordinate clause. In one embodiment, any descendants of an identified non-clausal verb are also added to the corresponding object.

According to a further embodiment, a non-clausal verb is identified as associated with the object word in response to any of the following conditions being satisfied: the object word is a direct parent of the non-clausal verb in the syntactic graph; the non-clausal verb is a direct parent of the object word in the syntactic graph; or the non-clausal verb shares an ancestor with the object word in the syntactic graph.

According to a further embodiment, forming an inferred clause for each potential combination of the one or more subjects with the one or more objects comprises determining the Cartesian product of the set of one or more subjects with the set of one or more objects. Each inferred clause therefore includes a different combination of one of the subjects, one of the objects, and the main verb.

According to a further embodiment, forming one or more inferred clauses comprises, applying coreference resolution to the natural language input to identify any reference words within the natural language input that indirectly refer to a corresponding entity via a corresponding main mention within the natural language input and replace any identified reference words with the corresponding main mention.

Accordingly, coreference resolution might be applied to avoid loss of context through the extraction of inferred clauses. An indirect reference could be via endophora or pro-form. A main mention could be a direct reference that directly (and independently) identifies the entity without reference to further words within the natural language input. In contrast, the indirect reference might refer to the entity through reference to another word (e.g., the main mention) within the natural language input.

According to a further embodiment, forming one or more inferred clauses comprises determining, for each independent clause, a corresponding core of the independent clause, the corresponding core comprising the main verb of the independent clause and any words not forming part of the set of one or more subjects, not forming part of the set of one or more objects, and not being a non-clausal verb, a modifier word or a conjunction; and for each independent clause, forming an inferred clause comprises including the core for the corresponding independent clause in the inferred clause.

A core may therefore be extracted from each independent clause, the core including at least the main verb for the independent clause. The formation of the inferred clause may therefore comprise the combination of the core with each combination of object and subject. Producing a core in this way avoids the loss of any information that has not already been included in the objects and subjects.

According to a further aspect, there is provided a computing system comprising one or more processors configured to: obtain a syntactic graph for a natural language input comprising a plurality of words, the syntactic graph comprising one or more syntactic labels, each syntactic label describing a corresponding syntactic relationship between corresponding words within the natural language input; and form one or more inferred clauses from the syntactic graph. The one or more inferred clauses are formed by: determining one or more independent clauses from the natural language input based on the one or more syntactic labels; for each independent clause, determining a set of one or more subjects and a set of one or more objects for the independent clause; and for each independent clause, forming an inferred clause for each potential combination of the one or more subjects with the one or more objects, each inferred clause comprising a corresponding combination of one of the one or more subjects with one of the one or more objects and with a main verb of the independent clause. The one or more processors are further configured to: determine a response to the natural language input based on at least one of the one or more inferred clauses; and output the determined response.

According to a further aspect, there is provided a non-transitory computer-readable medium comprising instructions that, when executed by a processor, cause the processor to: obtain a syntactic graph for a natural language input comprising a plurality of words, the syntactic graph comprising one or more syntactic labels, each syntactic label describing a corresponding syntactic relationship between corresponding words within the natural language input; form one or more inferred clauses from the syntactic graph; determine a response to the natural language input based on at least one of the one or more inferred clauses; and output the determined response. The one or more inferred clauses are formed by: determining one or more independent clauses from the natural language input based on the one or more syntactic labels; for each independent clause, determining a set of one or more subjects and a set of one or more objects for the independent clause; and for each independent clause, forming an inferred clause for each potential combination of the one or more subjects with the one or more objects, each inferred clause comprising a corresponding combination of one of the one or more subjects with one of the one or more objects and with a main verb of the independent clause.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
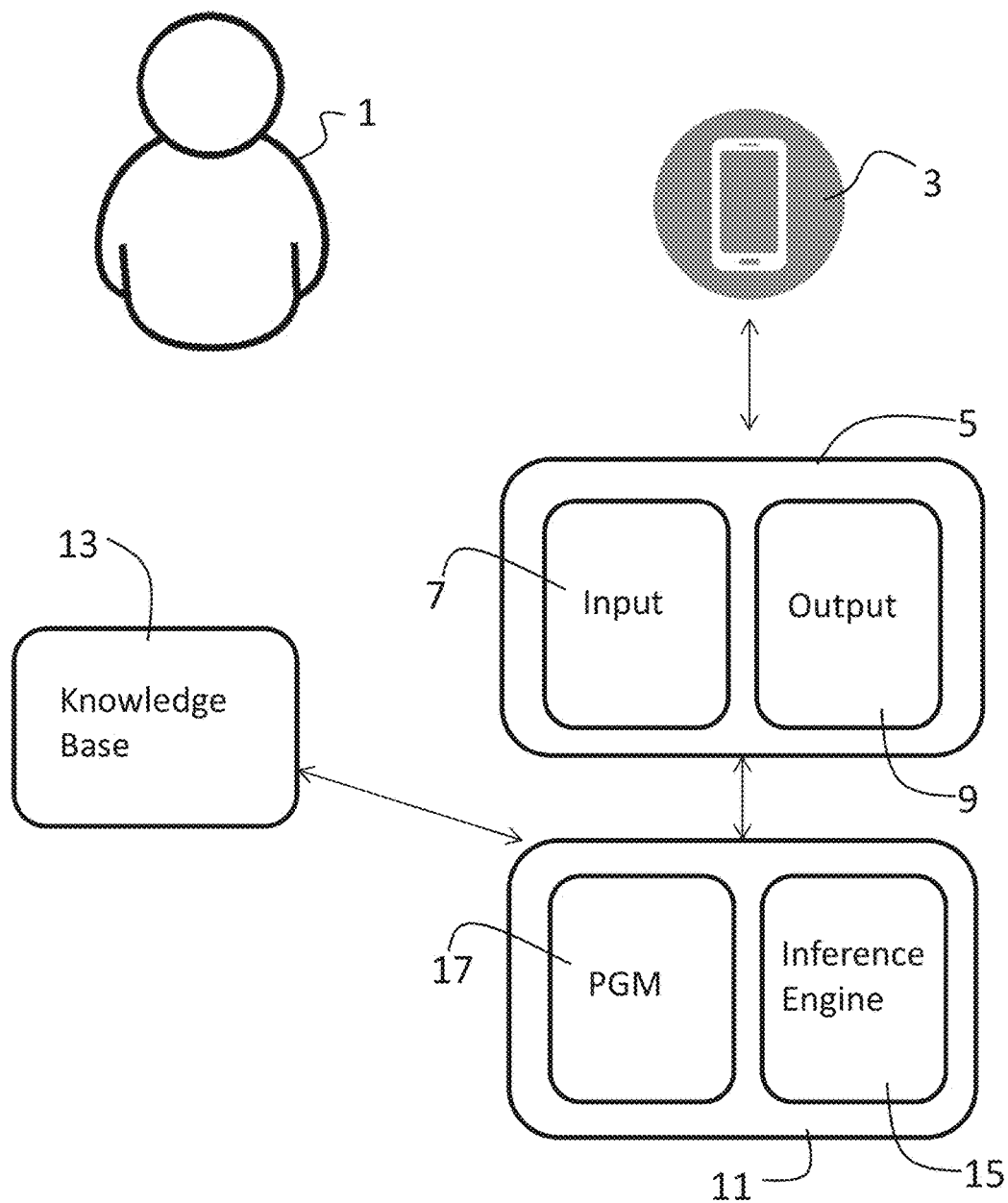
FIG. 1 shows a schematic of a dialogue system according to an embodiment.

The embodiments described herein provide improved computer-implemented methods for multiple intent recognition. Specifically, the methods described herein provide improved means for using a computer to parse a syntactic graph in order to extract inferred clauses.

Some computer-implemented methods for recognising multiple intents within natural language inputs treat the problem as a multi-label classification problem, in which each sentence is labelled with its potentially multiple intents, or a sequence-labelling problem in which each word is assigned to an intent. The downside of these classification approaches is that they are supervised learning techniques that require annotated conversational training data. It can be difficult to obtain sufficiently large sets of labelled data to enable such supervised learning systems to be trained. In addition, such systems generally need to be trained for their specific type of dialogue. These classifiers are therefore limited in that they are computationally expensive, requiring a large amount of labelled training data, and result in systems that can operate over only a narrow range of inputs.

The disclosed system provides an improvement to computer functionality by allowing for reduced memory capacity requirements and more flexible multiple intent recognition. The methods described herein rely on unsupervised representation learning and well-established, "off-the-shelf" syntactic dependency models that encode linguistic prior knowledge as syntactic graphs. The methods provide a novel means of parsing these syntactic graphs in order to extract multiple intents. Utilising generalised syntactic dependency models avoids the need for obtaining and processing large amounts of labelled training data. Furthermore, the methods described herein are applicable to any intent, as they do not require specifically trained models for classifying each intent. Furthermore, as the present methods do not require complex supervised learning models to classify a large number of intents, the methods described herein are more computationally efficient by allowing for reduced memory capacity requirements. Instead, all that needs to be stored is the rules for parsing the syntactic graph to extract the multiple inferred clauses, as described herein.

Whilst it is possible to derive inferred clauses from a semantic graph rather than a syntactic graph, basing the inferred clauses on the syntactic graph ensures improved accuracy and computational efficiency. This is because semantic graph generation is generally based on a syntactic graph. Accordingly, any errors in the generation of the semantic graph are added on top of potential errors from the syntactic graph. Basing the inferred clauses on a syntactic graph avoids the need for a semantic graph, thereby reducing the potential sources of error and reducing the computational steps and memory required to determine the inferred clauses.

Furthermore, the disclosed system addresses the technical problem of the relative inability for computing systems to understand natural language, with a technical solution that avoids the use of specifically trained classifiers by determining inferred clauses from a syntactic graph of the input. The technical solution disclosed herein allows methods described herein to function more efficiently and over a wider variety of potential inputs.

As the methods described herein are applied to syntactic graphs, they are applicable to any language for which a syntactic graph can be formed.

It is important for human-to-machine interfaces, such as dialogue systems, to accurately parse and understand the meaning of input text, as this allows the interfaces to correctly determine meaning and intent and respond appropriately.

Having said this, natural language processing is not limited to application within dialogue systems, and instead has application in a wide variety of computing fields in which it is important to determine the meaning of textual or spoken content (e.g., information extraction or information retrieval). For instance, a set of medical textbooks may be analysed to extract known relationships between medical conditions and medical symptoms (information extraction). Alternatively, a user may input "Please display my medical records" and the system may make use of natural language processing in order to determine the meaning of the user's request and determine the appropriate response to the request, to retrieve and display their medical records (information retrieval).

Dialogue System

FIG. 1 shows a schematic of a dialogue system according to an embodiment. In one embodiment, a user 1 communicates with the system via a mobile phone 3. However, any device could be used that is capable of communicating information over a computer network, for example, a laptop, tablet computer, information point, fixed computer, voice assistant, etc.

The mobile phone 3 communicates with interface 5. Interface 5 has two primary functions; the first function 7 is to take the words input by the user and turn them into a form that can be understood by the inference engine 11. These words may be text that is input (e.g., typed) into the mobile phone. Alternatively, these words may be spoken (uttered) by the user and recorded by the phone, for instance, via a microphone. The second function 9 is to take the output of the inference engine 11 and to send this back to the user's mobile phone 3.

In the present embodiments, Natural Language Processing (NLP) is used in the interface 5. NLP is one of the tools used to interpret, understand, and then use every day human language and language patterns. It breaks speech or text down into shorter components and interprets these more manageable blocks to understand what each individual component means and how it contributes to the overall meaning.

The interface 5 utilises a conversation-handling module for managing dialogue flows with a user. This is a dialogue system that generates queries for the user, determines the meaning behind the user's inputs and determines follow-up responses. This may be through the extraction of sub-phrases or sub-clauses from the user's inputs and the matching of these sub-clauses with expected user inputs to determine predefined follow-up responses. The conversation-handling model may be provided with simple logic that allows the device to, for example, direct the user 1 to a human operator, if required.

In a specific embodiment, the dialogue system is a diagnostic system that determines one or more potential medical conditions based on the user's inputs. Through NLP it is possible to transcribe consultations, summarise clinical records, and converse with users in a more natural, human way.

Naturally, it is important that the user's inputs are recognised effectively. The present embodiments are primarily concerned with improving input recognition accuracy and computational efficiency. However, simply understanding how users express their symptoms and risk factors is not enough to identify and provide reasons about the underlying set of diseases. For this, the diagnostic engine 11 is used. The diagnostic engine 11 is a powerful set of machine learning systems, capable of reasoning on a space of over hundreds of billions of combinations of symptoms, diseases and risk factors, per second, to suggest possible underlying conditions. The diagnostic engine 11 can provide reasoning efficiently, at scale, to bring healthcare to millions.

The diagnostic engine comprises an inference engine 15 and a probabilistic graphical model 17. The probabilistic graphical model 17 stores various potential symptoms, medical conditions, and risk factors. The inference engine 15 is a module that applies logical rules to the knowledge base and probabilistic graphical model to deduce new information (infer information from the input information, the knowledge base 13, and the probabilistic graphical model 17). The inference engine 15 aims to answer a specific overall question (in this case, "what is the diagnosis?"). The inference engine 15 generates questions for the user to answer in order to obtain information to answer the overall question. Each question is selected in order to reduce the overall uncertainty within the system.

In the present case, the inference engine 15 utilises the probabilistic graphical model 17 to determine a diagnosis. The inference engine 15 selects a question by choosing the question that would most increase the value of information (i.e., that would most decrease uncertainty in the diagnosis). The user's answer is then passed back to the inference engine 15 that uses this new information to generate a further question.

In an embodiment, the knowledge base 13 is a large structured set of data defining a medical knowledge base. A knowledge base is a set of facts and rules that the system has access to for determining a potential medical condition. The knowledge base 13 describes an ontology, which in this case relates to the medical field. It captures human knowledge on modern medicine encoded for machines. This is used to allow the above components to speak to each other. The knowledge base 13 keeps track of the meaning behind medical terminology across different medical systems and different languages. In particular, the knowledge base 13 includes data patterns describing a plurality of semantic triples, each including a medical related subject, a medical related object, and a relation linking the subject and the object.

An example use of the knowledge base 13 would be in automatic diagnostics, where the user 1, via mobile device 3, inputs symptoms they are currently experiencing, and the interface engine 11 identifies possible causes of the symptoms using the semantic triples from the knowledge base 13.

As the knowledge base 13 matches semantic triples in the knowledge base to semantic triples extracted from a conversation with a user, it is important that these semantic triples are extracted from the user's input text effectively. If inaccurate information is extracted from the input text, then the system will be less effective at processing the input and generating a response (e.g., less accurate at matching the input to semantic triples in the knowledge base, or less accurate at processing the input dialogue and determining an appropriate dialogue response). This means that the response will be less accurate. In addition, the system will be less computationally efficient, as it will require additional clarifying inputs (or additional post-processing steps on the inputs) in order to extract the necessary information.

To help accurately extract information from a natural language input, the methods described herein break down the input into a set of one or more inferred clauses. Generally speaking, the inferred clauses are the simplest syntactically complete sentences that can be formed from the input such that, if the inferred clauses are enumerated connected with the appropriate conjunctions, the meaning of the original sentence is recovered. This means that the inferred clauses relate to different sub-concepts taken from the input. By breaking the input down into inferred clauses, each inferred clause can be processed separately, allowing each sub-concept to be extracted more accurately.

For instance, the phrase "I like to eat and drink" can be broken down into the inferred clauses "I like to eat" and "I like to drink." It is easier to process these two independent inferred clauses (for instance, by determining their semantic similarity to one or more predefined inputs) than it would be to process the original phrase.

In addition to the extraction of information from user inputs for a dialogue system or diagnostic system, the methods described herein can also be utilised to build the knowledge base 13. The knowledge base 13 can be built by extracting information from large amounts of unstructured text. For instance, a medical knowledge base can be built by extracting semantic triples (e.g., corresponding medical conditions and medical symptoms) from medical text. The automatically extracted semantic triples can be validated by experts in order to ensure that they are accurate. These semantic triples can be easier to extract from inferred clauses than from original (potentially complex) natural language inputs. As the knowledge base 13 can be built through the extraction of semantic triples from data, the improved methods of intent recognition described herein can be used to make this process more accurate and more computationally efficient.

Extraction of Inferred Clauses

Figure 2:
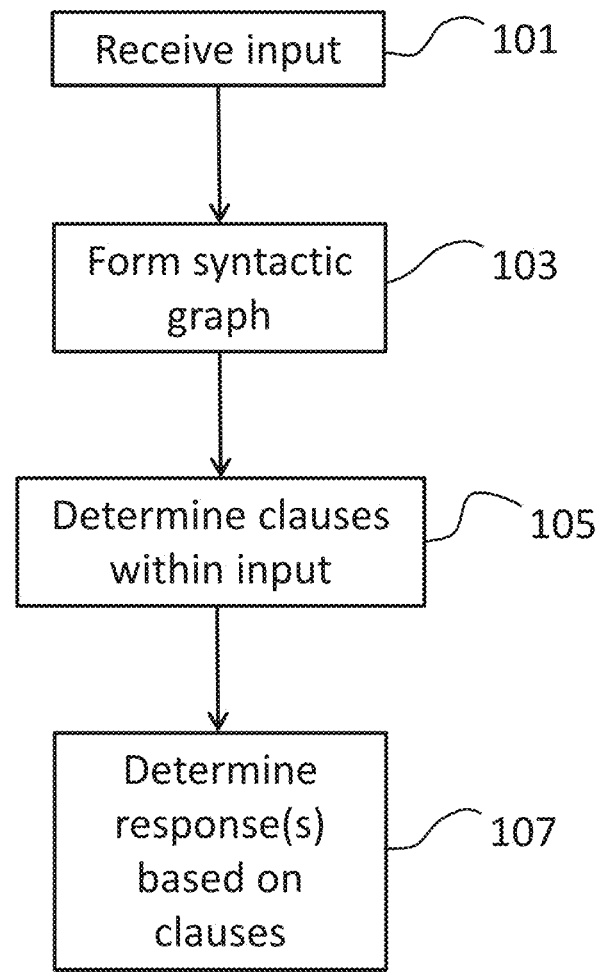
FIG. 2 shows a method for processing a natural language input from a user according to an embodiment.

FIG. 2 shows a method for processing a natural language input from a user according to an embodiment.

The method begins with the system receiving an input from the user 101. The input comprises a number of words. As described above, this may be an input from the user of a dialogue system, or may be an input from a text (e.g., a publication) from which information is being extracted.

A syntactic graph is then formed from the input 103. The words in the input are classified according to their syntactic roles within the input. That is, the relative syntactic relationships between the words are determined. To achieve this, the words are parsed using a syntactic dependency parser. An example of an appropriate syntactic parser is provided in the spaCy library provided by Explosion AI.

The semantic parse forms a syntactic graph (or syntactic dependency tree) with each node within the graph representing a token taken from the original input (e.g., a word or a group of one or more words having a particular syntactic role) and each edge representing a syntactic relationship between nodes. Each edge is labelled according to the corresponding syntactic relationship between the nodes that it connects. The syntactic graph is a dependency parse tree. It is an ordered, rooted tree that represents the syntactic structure of the input string according to a context-free grammar. The syntactic labels may be in accordance with any appropriate syntactic representations such as the Stanford Dependencies or Universal Dependencies.

A node is assigned to each span of one or more consecutive words within the input that have the same syntactic role. For instance, words may be grouped in terms of whether they form a verb conveying an action or an argument of the verb (e.g., relating to a noun). The types of nodes formed include noun nodes, verb nodes, and argument modifier nodes.

The method then determines one or more inferred clauses from the natural language input based on the syntactic graph 105. The method of determining the inferred clauses is described below.

Once a set of clauses has been determined, one or more responses are determined and output based on the clauses 107. The response may be the storage of information related to that clause (e.g., the identified symptoms or attributes), or may be a dialogue response that is associated with the clause. For instance, where a dialogue tree is being utilised, multiple clauses within a user's input may be utilised to select multiple options within the dialogue tree and progress the dialogue appropriately. Alternatively, if a slot-filling dialogue method is being used, each piece of identified information can be extracted and stored in order to determine the required pieces of information (the required slots that are to be filled).

One method of determining a dialogue response to a user input is to compare the input to a set of predefined inputs and selecting the most similar predefined input (and its corresponding predefined response). In order to more effectively determine the meaning behind the input text, the dialogue system may embed the input text to generate a vector representation for the input text. The vector representations can be generated based on machine learning models that have been trained on training data.

Each extracted clause can be embedded and compared to generate a vector representation of the clause (which will be referred to hereinafter as the clause vector representation) to other vector representations stored in a database. The other vector representations represent predefined inputs that the user may utilise (e.g., predefined answers to a question posed by the dialogue system). The dialogue system then determines whether the input vector representation is semantically similar to other vector representations within the database (through a similarity metric such as cosine similarity).

In light of the above, the present embodiment extracts one or more inferred clauses from the natural language input based on a syntactic parse of the input. The extraction of inferred clauses comprises a number of tasks, each of which is based on the dependency tree.

Figure 3:
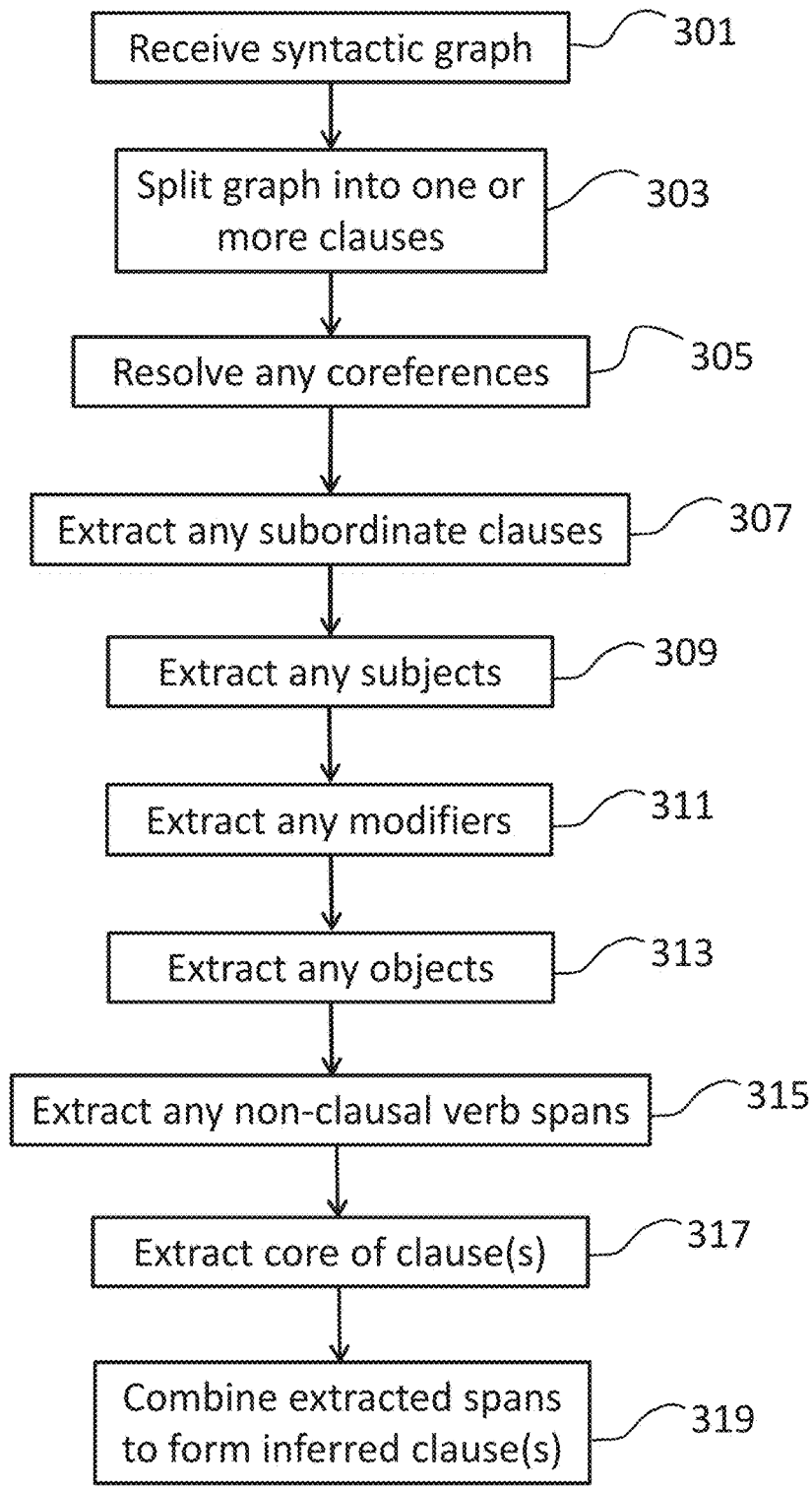
FIG. 3 shows a method of determining inferred clauses based on a syntactic graph according to an embodiment.

FIG. 3 shows a method of determining inferred clauses based on a syntactic graph according to an embodiment.

Initially, a syntactic graph of a natural language input is received 301. This may be determined by the system itself, or may be received from an external system that performs the syntactic parsing. The syntactic graph details the syntactic relationships between words within the natural language input.

The next step is to split the natural language input into one or more clauses 303. The semantic graph is read and split into one or more clauses based on the semantic relationships between the words in the natural language input.

Clauses are units of grammatical organisation, usually focused around a verb. To extract these, each of the verbs in the input is considered (by extracting tokens in the input which are Part-of-Speech (POS) tagged as 'VERB' by the syntactic dependency parse). Accordingly, the method identifies each word in the input that has a syntactic tag indicating that it is a verb. The tag for each verb is considered and if the verb has a dependency that indicates that it is the focus of an ordinate clause (an independent clause), then the verb is selected as the focus of an ordinate clause and its subtree in the dependency graph is extracted as an ordinate clause. The subtree here is the subtree of the dependency graph with the selected verb as the root of the subtree. That is, the verb and all its descendants are selected to form the clause. All subsequent steps are done on a per-clause basis (on the subtree for the selected verb).

An ordinate (or independent) clause is a clause that does not depend on any other clause for meaning or grammatical validity. To determine whether the verb forms the focus of an ordinate clause, the method determines whether the syntactic tag indicates a syntactic dependency according to an ordinate clause. In practice, a list of tags falling within an ordinate clause may be maintained. Alternatively, a list of excluded tags for identifying ordinate clauses may be maintained.

In the present embodiment, the verb is considered to form the focus of an ordinate clause if it does not have a dependency tag that falls within a set of excluded tags (including tags relating to subordinate clauses and non-clausal verbs). A list of excluded tags is provided in Table 1. Other tags might exist that could be excluded, depending on the type of syntactic tagging that has been applied, but the tags of Table 1 relate to the tags that are commonly applied to verbs that do not form the focus of independent clauses in common dependency parses.

Figure 4A:
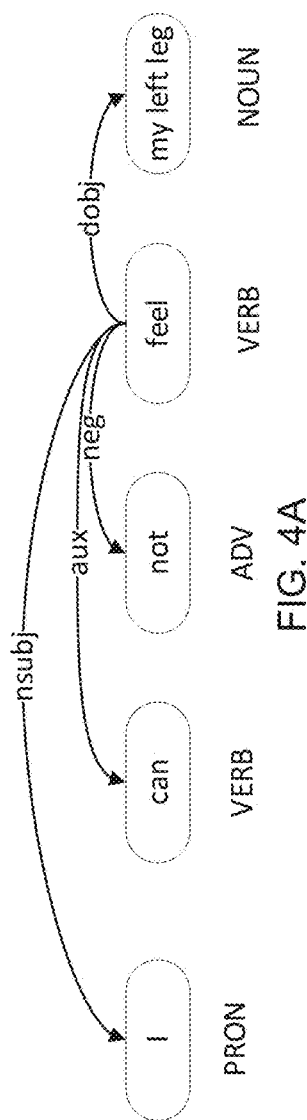
FIG. 4A shows an example of a syntactic graph for the phrase "I cannot feel my left leg"

FIG. 4A shows an example of a syntactic graph for the phrase "I cannot feel my left leg." In this example, the phrase has two verbs "can" and "feel." Having said this, only "feel" relates to the focus of an independent clause. The verb "can" is an auxiliary verb, as indicated by the "aux" tag making "can" dependent on the main verb "feel."

Accordingly, in this case, the method would extract a single clause based around the verb "feel." To achieve this, the subtree of the verb "feel" is selected for the clause. As all of the words in the current example are dependent on this core verb, the whole phrase is extracted as the clause.

TABLE 1 list of excluded tags for assessment of ordinate clauses

| Tag | Type | Meaning |
| --- | --- | --- |
| xcomp | Open clausal complement | Link between a verb or adjective and a verb phrase complement |
| relcl | Relative clause modifier | Relative clause modifying a noun |
| advcl | Adverbial clause modifier | Link between a verb and a verb heading a modifier clausal phrase |
| aux | Auxiliary | Link between a content verb and an auxiliary verb |
| auxpass | Passive auxiliary | Link between a verb and a passive auxiliary verb |
| ccomp | Clausal complement | Link between a verb or adjective and a clausal phrase complement |
| amod | Adjectival modifier | A link from a noun to an adjective modifier |
| acl | Clausal modifier of noun (adjectival clause) | Relative clause modifying a noun |
| compound | Compound | Compound relation for a multiword expression |
| pcomp | Prepositional complement | Link between preposition and verb to complete prepositional phrase |
| pobj | Object of a preposition | Link between preposition and its object |
| dobj | Direct object | Link between a verb and its accusative object |
| iobj | Indirect object | Link between a verb and its dative object |

Figure 4B:
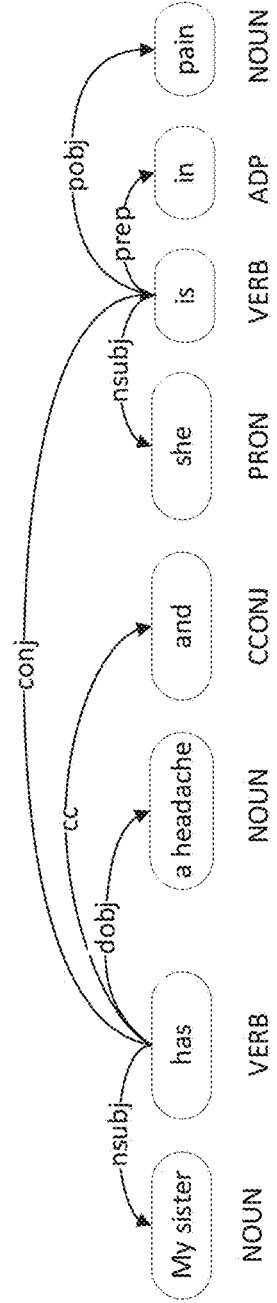
FIG. 4B shows an example of a syntactic graph for the phrase "My sister has a headache and she is in pain"

FIG. 4B shows an example of a syntactic graph for the phrase "My sister has a headache and she is in pain." In this case, there are two main verbs "has" and "is." Accordingly, in this case, the method would extract two clauses, one based around the main verb "has" and one based around the main verb "is." This would result in two subtrees, one for "My sister has a headache" and one for "she is in pain."

It can be seen from FIG. 4B that some context can be lost through clause splitting. The second clause extracted in this example includes a reference "she" that loses context when separated from the first clause. Accordingly, returning to FIG. 3, the next step is to apply coreference resolution 305. Coreference is where two or more expressions refer to the same entity (same person or object). Accordingly, coreference resolution is applied to each clause to replace any reference with the corresponding main mention. In the current example, this would replace the term "she" with the main reference "my sister" to produce the two clauses "My sister has a headache" and "My sister is in pain." An example of a coreference resolution system is that provided by in the spaCy library by Explosion AI.

The next step is to extract subordinate clauses from the syntactic graph for each inferred clause 307. This involves identifying each token (each word) in the input that has a dependency tag that indicates that it is the root of a subordinate clause (e.g., 'advcl' for adverbial subordinate clauses, 'rad' for relative subordinate clauses or 'act' for clausal modifiers of nouns). For each token marked with a subordinate clause tag, the subtree for that token is extracted. Each token that forms part of a subordinate clause (that forms part of the extracted subtree for a subordinate clause) is marked as part of a subordinate clause for later use within this method.

Then the method extracts any subjects from the subtree of each clause 309. A subject of a sentence is an entity (a person or thing) about which a statement is made. To extract the subjects, each token in the clause subtree is considered. If the dependency tag of the token indicates that it is a subject (e.g., 'nsubj' for noun subjects), then the token's subtree is extracted and marked as a subject span. This ensures that the entire subject span is extracted. In this context, the term 'span' refers to a collection of one or more tokens (one or more words or groups of words).

Syntactic tags indicating a subject include 'nsubj' (nominal subject), 'nsubjpass' (passive nominal subject), 'csubj' (clausal subject), and 'csubjpass' (passive clausal subject).

For example, in the phrase 'My sister and I have pain in our arms and numbness in our legs,' the tokens 'sister' and 'I' will both have a tag indicating that they relate to a subject. If only the token 'sister' were extracted as the subject, information would be lost. By taking the subtree, the entirety of 'My sister' is extracted as a subject (as the token 'My' is dependent on 'sister' and is therefore extracted when the subtree for 'sister' is extracted). This ensures that the full subject is extracted without any loss of context.

The method then extracts any modifier spans from each clause 311. Each token in each clause is considered and, if it has a dependency indicating an argument modifier, the token's subtree is extracted and marked as a modifier span. For example, in 'My sister and I have pain in our arms and numbness in our legs,' both 'in our arms' and 'in our legs' will be extracted as modifier spans.

Examples of syntactic tags relating to modifiers include 'prep' for prepositional modifiers, 'npadvmod' for temporal modifiers, and 'advmod' for adverbial modifiers.

The method then extracts objects from the clauses 313. An object of a sentence is the entity that is acted upon by the subject of the sentence. To extract these, each token in the clause is considered. If the token's dependency indicates that it is an object, then the token's subtree is extracted and marked as an object span.

This step ensures that the entirety of the object spans are extracted. For example, in 'My sister and I have pain in our arms and numbness in our legs,' the tokens 'arms' and 'legs' will both have the correct dependency for an object. Taking the subtrees for these objects extracts the entirety of the object spans 'our arms' and 'our legs.'

Examples of tags indicating an object including 'conj' (conjunct), 'dobj' (direct object), 'pobj' (object of a preposition), 'iobj' (indirect object), 'appos' (appositional modifier), 'ROOT' (root), 'nmod' (nominal modifier), 'dative' (dative object), and 'attr' (attributive).

The method then extracts any non-clausal verb spans from the clauses 315. This step extracts the verbs that are not the focus of either an ordinate or subordinate clause, but still indicate some semantic meaning within an input. For example, in the input 'I like to run and cycle,' the verbs 'to run' and 'cycle' do not indicate either an ordinate or subordinate clause, but require splitting in order to correctly segment the input. To extract these, for each verb in the clause, if the verb is not the focus of an ordinate clause (as identified in step 303) or a subordinate clause (as identified in step 307), then the token's subtree is extracted and marked as forming a non-clausal verb span. Examples of non-clausal verb tags include 'xcomp' (open clausal complement), 'ccomp' (clausal complement), 'amod' (adjectival modifier), and 'compound' (compound relation).

The method then extracts the core span of each clause 317. The core of an input refers to all tokens which do not belong to a subject, object, modifier, or non-clausal verb, and are not conjunctions (e.g., 'and,' 'or,' etc). These tokens are identified and marked as core spans. Generally, each core span will include at least the verb that forms the focus of the respective clause.

Once the respective spans have been extracted, they are combined to form inferred clauses 319. Here, the extracted spans for the subjects, modifiers, objects, and non-clausal verbs are combined together, using a number of criteria, to form segments.

It should be noted that, whilst FIG. 3 shows a specific order of steps, the steps can be reordered without altering the effect of the method. For instance, each of the extraction steps 307-317 can be performed in any order and/or one or more of these extraction steps 307-317 can be performed in parallel. For instance, the extraction of subordinate clauses 307 can be performed in parallel to the extraction of non-clausal verb spans 315. By extraction, it is meant that the syntactic graph is parsed and the relevant tokens are identified. This may be via storing the relevant tokens in a table corresponding to the identified syntactic type, or may be via marking or otherwise noting the association with these tokens with the corresponding syntactic type.

Figure 4C:
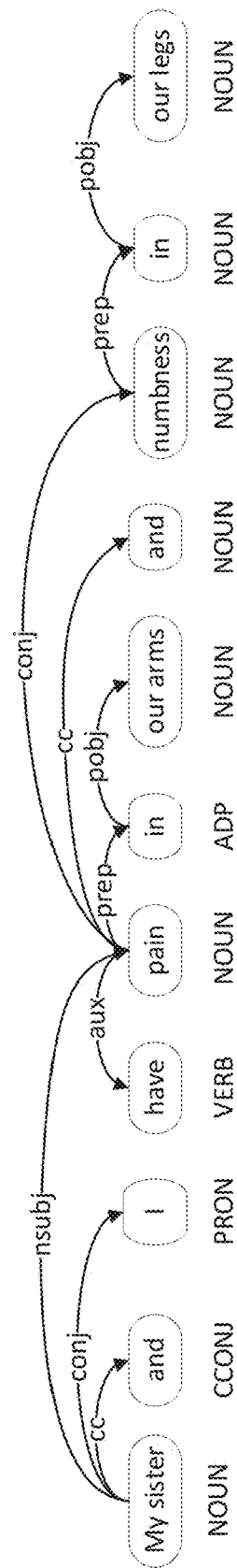
FIG. 4C shows an example of a syntactic graph for the phrase "My sister and I have pain in our arms and numbness in our legs"

FIG. 4C shows an example of a syntactic graph for the phrase "My sister and I have pain in our arms and numbness in our legs." There is only a single ordinate clause relating to the verb "have," so this would result in the extraction of a single clause subtree (relating to the entirety of the syntactic graph for the original input phrase).

The span extraction performed on this example would result in the below selected subjects, modifiers, objects, non-clausal verbs, and core:

| Subjects | Modifiers | Objects | Non-clausal verbs | Core |
|---|---|---|---|---|
| [My sister, I] | [in our arms, in our legs] | [pain, numbness] | [ ] | [have] |

As can be seen above, the method extracts a combined subject span in the form of "My sister" as well as combined modifier spans "in our arms" and "in our legs." The remaining spans relate to single tokens (words). The result is therefore a set of spans for each syntactic type (subject, modifier, object, non-clausal verb, and core). The sets are then combined to form one or more inferred clauses.

Each span is a combination of one or more tokens, ordered based on the original order of the tokens in the input.

Figure 5:
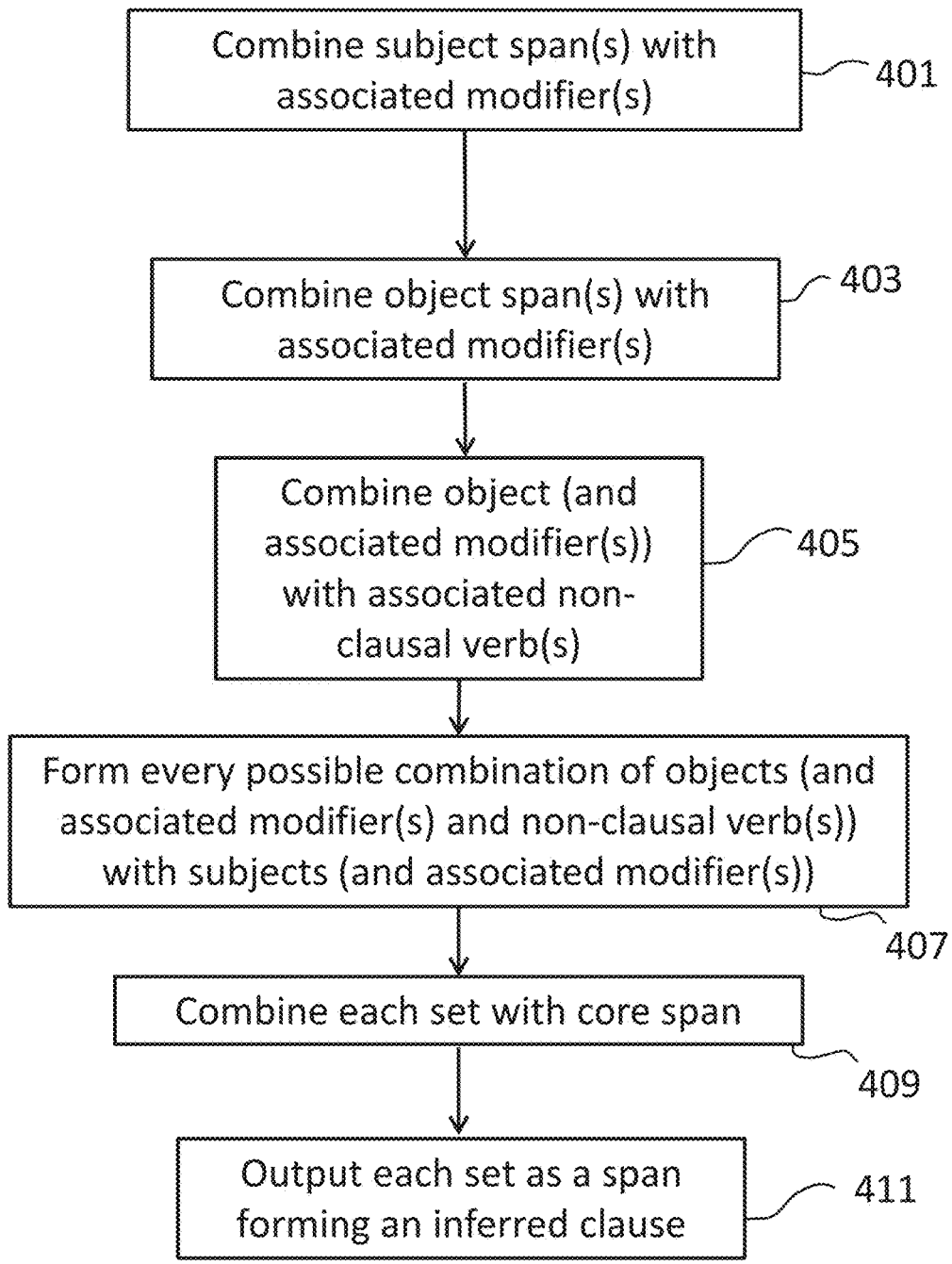
FIG. 5 shows a method of combining extracted spans to form inferred clauses according to an embodiment.

FIG. 5 shows a method of combining extracted spans to form inferred clauses according to an embodiment. This relates to step 319 from the method of FIG. 3. The method of FIG. 5 will be discussed with reference to the example input of FIG. 4C.

The method combines the extracted spans together, forming sets of spans that are ultimately combined to form a set of one or more inferred clauses. In general, each combination of core, subject, and object is formed along with the associated modifiers for each subject and object, and associated non-clausal verbs for each object.

A subject or object is associated with a modifier if it shares a common ancestor with the modifier (e.g., it is a sibling of the modifier) or if it is a direct parent of the modifier. For instance, in the syntactic graph of FIG. 4B, the modifier 'in' is associated with 'pain' as it is a sibling of 'pain' ('pain' and 'in' share the common ancestor 'is'). Similarly, an object is associated with a non-clausal verb if it shares a common ancestor with the non-clausal verb or if it is the direct parent of the non-clausal verb.

The combined sets of spans are ordered in accordance with their order in the original input.

First, each subject span is combined with each of its associated modifier spans 401. That is, each subject span is combined with each of the modifiers with which it shares a common ancestor, or is the direct parent of, in the dependency tree. This forms, for each subject span, a subject set comprising the subject span and any associated modifier spans. Each subject set is stored in a set of subject sets, including each subject span combined with any associated modifier spans.

In the example of FIG. 4C, no modifiers apply to any subjects, so no combinations are required in this example. That is, none of the subjects is associated with a modifier in the syntactic graph. Accordingly, no combinations of subjects and modifiers are performed in this example. The set of subject sets would therefore stay as [[My sister], [I]].

In contrast, in the example of FIG. 4B, the subject 'she' would be combined with the modifier 'in' (although, applying coreference resolution would result in a subject set [My sister, in]).

Each object span is then combined with each of its associated modifier spans 403. That is, each object span is combined with each of the modifiers with which it shares a common ancestor, or is the direct parent of, in the dependency tree. This forms, for each object span, an object set comprising the object span and any associated modifier spans. The object sets are stored in an updated set of object sets, including each object span combined with any associated modifier spans.

In the example of FIG. 4C, 'pain' is the direct parent of the token 'in' in 'in our arms,' so these two spans are combined. This forms the object set [pain, in our arms]. Equally, 'numbness' is the direct parent of the token 'in' in 'in our legs,' so these two spans are combined. This forms the object set [numbness, in our legs]. The updated set of object sets would therefore be [[pain, in our arms], [numbness, in our legs]].

| Subjects | Object/modifier pairs | Non-clausal verbs | Core |
| --- | --- | --- | --- |
| [My sister, I] | [[pain, in our arms], [numbness, in our legs]] | [ ] | [have] |

Each of the object sets is then combined with each of its associated non-clausal verb spans 405. Each object set (being either an object span or an object-modifier pair) is combined with each of the non-clausal verbs with which the object shares a common ancestor, or is the directly linked, in the dependency tree. By directly linked, it is meant that the object set is a parent of the non-clause verb or the non-clause verb is the parent of the object set. The set of object sets is updated to include any new combination(s). The set of object sets may therefore include one or more object spans (where no modifier or non-clausal verb is associated with the object), one or more combinations of object spans and modifier spans (where one or more modifier spans are associated with the object but no non-clausal verb spans are associated with the object), and one or more combinations of object spans, modifier spans and non-clausal verb spans (where one or more modifier spans and one or more non-clausal verb spans are associated with the object).

In this input of FIG. 4C, there are no non-clausal verbs. Accordingly, no non-clausal verbs are combined with the object/modifier pairs.

Each object set is then combined with each subject set 407. That is, each set combined around an object (e.g., a combination of objects with any associated modifier(s) and non-clausal verb(s)) is combined with each set combined around a subject (e.g., a combination of subject with any associated modifier(s)). All possible unique combinations of subject sets and object sets are obtained. This can be achieved by taking the Cartesian product of the set of subject sets with the set of object sets.

In the example of FIG. 4C, this forms the sets [my sister, pain in our arms], [my sister, numbness in our legs], [I, pain in our arms], [I, numbness in our legs].

| Object/modifier/verb/subject sets | Core |
| --- | --- |
| [[My sister, pain, in our arms], [My sister, numbness, in our legs], [I, pain, in our arms], [I, numbness, in our legs]] | [have] |

Each of these combined sets is then combined with the core of the clause 409. The core is the verb around which the clause is focused and any other tokens that do not fall within the subject, object, modifier, or non-clausal verb categories. This forms a set of combinations, each comprising an object with any associated modifiers and non-clausal verbs, a subject with any associated modifiers, and a core. Each combination may be formed into an inferred clause by concatenating each span within the combination in accordance with the relative ordering of the tokens within the initial input. Each inferred clause is then output 411.

In the example of FIG. 4C, adding each of the combined spans to the core results in the following sets:

[My sister, pain, in our arms, have]→My sister have pain in our arms

[My sister, numbness, in our legs, have]→My sister have numbness in our legs

[I, pain, in our arms, have]→I have pain in our arms

[I, pain, in our arms, have]→I have pain in our arms

The spans are ordered by token index (based on the original location of the token within the original input) and are joined together into text.

Each of these combinations forms a corresponding inferred clause. Whilst the inferred clauses might not be fully grammatically correct, they maintain the overall intent of the message that is suitable for use, for instance, in diagnosing a medical condition. If the grammar is of particular importance, the inferred clauses can be put through a grammar checker and corrected before output (e.g., to change 'I have pain in our arms' to 'I have pain in my arms' or to change 'My sister have numbness in our legs' to 'My sister has numbness in her legs').

It should be noted that each time a set of words is combined with another set of words, any duplication of words between the sets is removed. For instance, due to the manner in which subjects, objects, and modifiers are formed, there can be situations where a word is shared between a modifier and its corresponding subject or object. For instance, in the example of FIG. 4B, the modifier 'in' would be combined with both the object 'pain' and also the subject 'My sister' (resolved from the reference 'she'). This would form the sets [pain, in] and [My sister, in]. If no duplications were removed, then this could result in the inferred clause 'My sister is in in pain.' Accordingly, when sets are combined, any repetition of the same instance of a word is removed, so that only a single instance of each word in the combined set is provided.

The above method provides every potential combination of subject, core, and object. Each of the sets based around the subjects is combined with each of the sets based around the objects (to form every possible combination). This can be achieved by taking the Cartesian product of the set of subject sets and the set of object sets and combining this with the core. The result is a set of combinations of spans. The spans within each combination are ordered according to their original ordering within the input. Each of these combinations represents a segment conveying an inferred clause.

By forming inferred clauses from a syntactic dependency graph of a natural language input, the methods described herein are applicable to a wide variety of language use-cases without requiring specifically trained classifiers for each use case. This therefore provides a more flexible and more computationally efficient means of identifying inferred clauses within a natural language input. In addition, by basing the methods around syntax (rather than semantics), the methods described herein are more accurate and computationally efficient than alternative methods that might derive inferred clauses from syntactic graphs (which are, in themselves, based on syntactic graphs).

Whilst the embodiment of FIG. 5 shows steps that are taken in a particular order, the order of these steps may be changed whilst still achieving the same function. One or more of the steps may be moved relative to and/or performed in parallel to one or more other steps. For instance, step 405 may be performed before or in parallel to one or more of steps 403 and 405.

In addition, whilst the above embodiments show the extraction of spans according to various syntactic types (e.g., subjects, objects, etc.) before forming sets and combining them to form inferred clauses, these two steps may be performed in parallel (e.g., the subject spans may be extracted and added to a set of subject sets (each being a singleton) before the object spans are extracted and added to a set of object sets (each being a singleton), etc.).

Computing System

Figure 6:
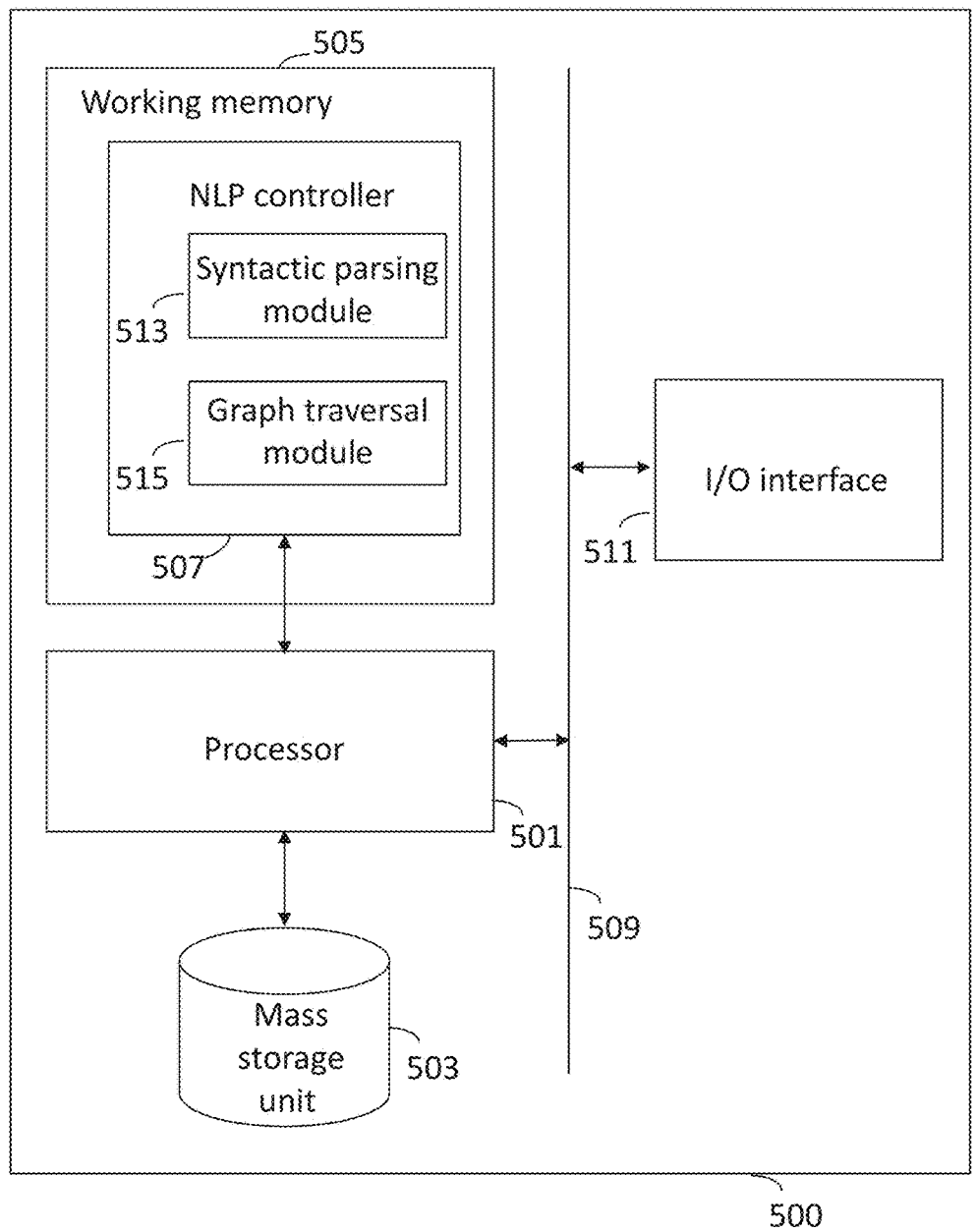
FIG. 6 shows a computing system for implementing the methods described herein according to an embodiment.

While the reader will appreciate that the above embodiments are applicable to any commuting system for recognising user inputs, a typical computing system is illustrated in FIG. 6, which provides means capable of putting an embodiment, as described herein, into effect. As illustrated, the computing system 500 comprises a processor 501 coupled to a mass storage unit 503 and accessing a working memory 505. As illustrated, a natural language processing (NLP) controller 507 is represented as a software product stored in working memory 505. However, it will be appreciated that elements of the NLP controller 507 may, for convenience, be stored in the mass storage unit 503.

Usual procedures for the loading of software into memory and the storage of data in the mass storage unit 503 apply. The processor 501 also accesses, via bus 509, an input/output interface 511 that is configured to receive data from and output data to an external system (e.g., an external network or a user input or output device). The input/output interface 511 may be a single component or may be divided into a separate input interface and a separate output interface.

The NLP controller 507 includes a syntactic parsing module 513 and a graph traversal module 515. The syntactic parsing module 513 is configured to determine the syntactic relationships between the words in an input set of words and form a syntactic dependency graph. The graph traversal module 515 is configured to extract one or more inferred clauses from the input set of words using the syntactic graph.

The input words may be received as text in machine-readable format or may be determined from an audio signal via automatic speech recognition. Thus, execution of the NLP software 507 by the processor 501 will cause embodiments as described herein to be implemented.

The NLP controller 507 may be configured to determine whether the input of one or more words match any of the predefined inputs stored in the mass storage unit 503 and to output a response to the user input as described herein in order to simulate a conversation according to the predefined conversation flow. The user input may be embedded as a set of one or more word embeddings for processing by NLP controller 507.

In an alternative embodiment, the NLP controller 507 includes an information extraction module. This extracts semantic triples from the inferred clauses, either for matching with information in a knowledge base, or for storing (e.g., in order to build up a knowledge base).

The NLP controller software 507 can be embedded in original equipment, or can be provided, as a whole or in part, after manufacture. For instance, the NLP controller software 507 can be introduced, as a whole, as a computer program product, which may be in the form of a download, or to be introduced via a computer program storage medium, such as an optical disk. Alternatively, modifications to an existing NLP controller 507 can be made by an update, or plug-in, to provide features of the above described embodiment.

The computing system 500 may be an end-user system that receives inputs from a user (e.g., via a keyboard or microphone) and determines responses to the inputs based on the similarity of the inputs to predefined inputs. Alternatively, the system may be a server that receives input over a network and determines the response, which is then conveyed back to the user device. Either way, the system is configured to determine a response a user inputs to implement a conversation flow, as discussed herein.

The mass storage unit 503 may store predefined inputs and corresponding responses to those inputs for use in a dialogue flow. The NLP controller 507 may be configured to determine similarity values with respect to an input phrase (e.g., one of the inferred clauses) relative to each of the predefined phrases for the current state of the system (the current position within a predefined dialogue flow). The system may then determine the most similar predefined phrase and then respond with the corresponding predefined response that is associated with that predefined phrase. The predefined phrases may be stored as sets of embedding vectors.

In addition, the mass storage unit 503 may be configured to store semantic triples, either those extracted from input text (e.g., extracted from the inferred clauses), or preloaded into the system for use when handling input text (e.g., handling information retrieval requests or determining inferred information from the input text).

The methods described herein provide a means for extracting multiple intents from a single natural language input for use in natural language processing systems such as dialogue systems or information extraction systems. The embodiments described herein avoid the use of specifically trained classifiers by extracting inferred clauses based on a syntactic graph of the input. This allows the embodiments to work over a variety of fields of language and provides methods and systems that are more computationally efficient by avoiding the need to train the system using a large number of labelled training data. By determining inferred clauses based on a syntactic graph (rather than a semantic graph), the additional computation and potential errors introduced by the calculation of a semantic graph from a syntactic graph are avoided.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions, and changes to the specific implementations described herein may be made without departing from the scope of protection defined in the following claims.

The invention claimed is:

1. A computer-implemented natural language processing method comprising:
   obtaining a syntactic graph for a natural language input comprising a plurality of words, the syntactic graph comprising one or more syntactic labels, each syntactic label describing a corresponding syntactic relationship between corresponding words within the natural language input;
   forming one or more inferred clauses from the syntactic graph by:
      determining one or more independent clauses from the natural language input based on the one or more syntactic labels;
      for each independent clause, determining a set of one or more subjects and a set of one or more objects for the independent clause; and
      for each independent clause, forming an inferred clause for each potential combination of the set of one or more subjects with the set of one or more objects, each inferred clause comprising a corresponding combination of one of the set of one or more subjects with one of the set of one or more objects and with a main verb of the independent clause;
   determining a response to the natural language input based on at least one of the one or more inferred clauses; and
   outputting the determined response.

2. The method of claim 1 wherein determining one or more independent clauses from the natural language input comprises, for each word from the plurality of words that has a syntactic label indicating that the word is the main verb that is the focus of an independent clause, identifying a subtree for the word from the syntactic graph to relate to a corresponding independent clause.

3. The method of claim 1 wherein determining a set of one or more subjects for the independent clause comprises identifying each word within the independent clause that has a syntactic label identifying the word as a subject word and assigning the subject word to a corresponding subject for the independent clause.

4. The method of claim 3 wherein determining a set of one or more subjects for the independent clause further comprises, for each identified subject word, identifying any descendants of the subject word from the syntactic graph and adding any identified descendants to the subject for that subject word.

5. The method of claim 3 wherein determining a set of one or more subjects for the independent clause comprises, for each identified subject word:
   identifying any modifier words associated with the subject word in the syntactic graph; and
   adding any identified modifier words to the subject according to the corresponding subject word.

6. The method of claim 5 wherein a modifier word is identified as associated with the subject word in response to any of the following conditions being satisfied:
   the subject word is a direct parent of the modifier word in the syntactic graph; or
   the modifier word shares an ancestor with the subject word in the syntactic graph.

7. The method of claim 1 wherein determining a set of one or more objects for the independent clause comprises identifying each word within the independent clause that has a syntactic label identifying the word as an object word and assigning the object word to a corresponding object for the independent clause.

8. The method of claim 7 wherein determining a set of one or more objects for the independent clause comprises, for each identified object word, identifying any descendants of the object word from the syntactic graph and adding any identified descendants to the object for that object word.

9. The method of claim 7 wherein determining a set of one or more objects for the independent clause comprises, for each identified object word:
   identifying any modifier words associated with the object word in the syntactic graph; and
   adding any identified object words to the object according to the corresponding object word.

10. The method of claim 9 wherein a modifier word is identified as associated with the object word in response to any of the following conditions being satisfied:
    the object word is a direct parent of the modifier word in the syntactic graph; or
    the modifier word shares an ancestor with the object word in the syntactic graph.

11. The method of claim 7 wherein determining a set of one or more objects for the independent clause comprises, for each identified object word:
    identifying any non-clausal verbs associated with the object word in the syntactic graph; and
    adding any identified non-clausal verbs to the object according to the corresponding object word.

12. The method of claim 11 wherein a non-clausal verb is identified as associated with the object word in response to any of the following conditions being satisfied:
    the object word is a direct parent of the non-clausal verb in the syntactic graph;
    the non-clausal verb is a direct parent of the object word in the syntactic graph; or
    the non-clausal verb shares an ancestor with the object word in the syntactic graph.

13. The method of claim 1 wherein forming an inferred clause for each potential combination of the one or more subjects with the one or more objects comprises determining the Cartesian product of the set of one or more subjects with the set of one or more objects.

14. The method of claim 1 wherein, forming one or more inferred clauses comprises applying coreference resolution to the natural language input to identify any reference words within the natural language input that indirectly refer to a corresponding entity via a corresponding main mention within the natural language input and replace any identified reference words with the corresponding main mention.

15. The method of claim 1 wherein:
   forming one or more inferred clauses comprises determining, for each independent clause, a corresponding core of the independent clause, the corresponding core comprising the main verb of the independent clause and any words not forming part of the set of one or more subjects, not forming part of the set of one or more objects, and not being a non-clausal verb, a modifier word, or a conjunction; and
   for each independent clause, forming an inferred clause comprises including the core for the corresponding independent clause in the inferred clause.

16. A computing system comprising one or more processors configured to:
   obtain a syntactic graph for a natural language input comprising a plurality of words, the syntactic graph comprising one or more syntactic labels, each syntactic label describing a corresponding syntactic relationship between corresponding words within the natural language input;
   form one or more inferred clauses from the syntactic graph by:
      determining one or more independent clauses from the natural language input based on the one or more syntactic labels;
      for each independent clause, determining a set of one or more subjects and a set of one or more objects for the independent clause; and
      for each independent clause, forming an inferred clause for each potential combination of the one or more subjects with the one or more objects, each inferred clause comprising a corresponding combination of one of the one or more subjects with one of the one or more objects and with a main verb of the independent clause;
   determine a response to the natural language input based on at least one of the one or more inferred clauses; and
   output the determined response.

17. A non-transitory computer-readable medium comprising instructions that, when executed by a processor, cause the processor to:
   obtain a syntactic graph for a natural language input comprising a plurality of words, the syntactic dependency graph comprising one or more syntactic labels, each syntactic label describing a corresponding syntactic relationship between corresponding words within the natural language input;
   form one or more inferred clauses from the syntactic graph by:
      determining one or more independent clauses from the natural language input based on the one or more syntactic labels;
      for each independent clause, determining a set of one or more subjects and a set of one or more objects for the independent clause; and
      for each independent clause, forming an inferred clause for each potential combination of the one or more subjects with the one or more objects, each inferred clause comprising a corresponding combination of one of the one or more subjects with one of the one or more objects and with a main verb of the independent clause;
   determine a response to the natural language input based on at least one of the one or more inferred clauses; and
   output the determined response.

\* \* \* \* \*